United States Patent [19]

Lahoda et al.

[11] Patent Number: 4,576,123
[45] Date of Patent: Mar. 18, 1986

[54] WORKPIECE POSITIONING APPARATUS WITH PLURAL SENSORS

[75] Inventors: Edward J. Lahoda, Edgewood; David A. Eckhardt, Penn Hills, both of Pa.

[73] Assignee: Westinghouse Electric Corp., Pittsburgh, Pa.

[21] Appl. No.: 632,976

[22] Filed: Jul. 20, 1984

[51] Int. Cl.$^4$ .................. F22B 37/54; F28F 15/00; F28G 9/00
[52] U.S. Cl. .................. 122/382; 15/316 R; 122/392
[58] Field of Search .............. 122/379, 392, 390, 382; 15/316 R, 316 A

[56] References Cited

U.S. PATENT DOCUMENTS

| | | |
|---|---|---|
| 4,273,076 | 6/1981 | Lahoda et al. |
| 4,276,856 | 7/1981 | Dent et al. |
| 4,355,536 | 10/1982 | McShane et al. |
| 4,424,769 | 1/1984 | Charamathieu et al. |
| 4,445,465 | 5/1984 | Byrd et al. .................. 122/382 X |

Primary Examiner—Edward G. Favors
Attorney, Agent, or Firm—L. A. DePaul

[57] ABSTRACT

A sludge lance nozzle for removing sludge from between the tubes of a nuclear steam generator includes positioning apparatus mounted on top of the nozzle. The tubes are arranged in rows and columns with the axes of the tubes in each column lying in a common column plane. The nozzle is moved perpendicular to the column planes close to one of the rows of tubes. In one embodiment, the positioning apparatus comprises two transmitter/receivers for transmitting signals and receiving reflected signals along axes parallel to the column planes, the axes being spaced apart by odd multiples of one-half tube pitch. The received signals are subtracted to produce a position indicating signal. In another embodiment the positioning apparatus includes a transmitter and a receiver spaced apart in the direction of movement of the nozzle, the transmitter transmitting a signal in a first predetermined direction, and the receiver being responsive only to reflected signals received from a second predetermined direction.

20 Claims, 4 Drawing Figures

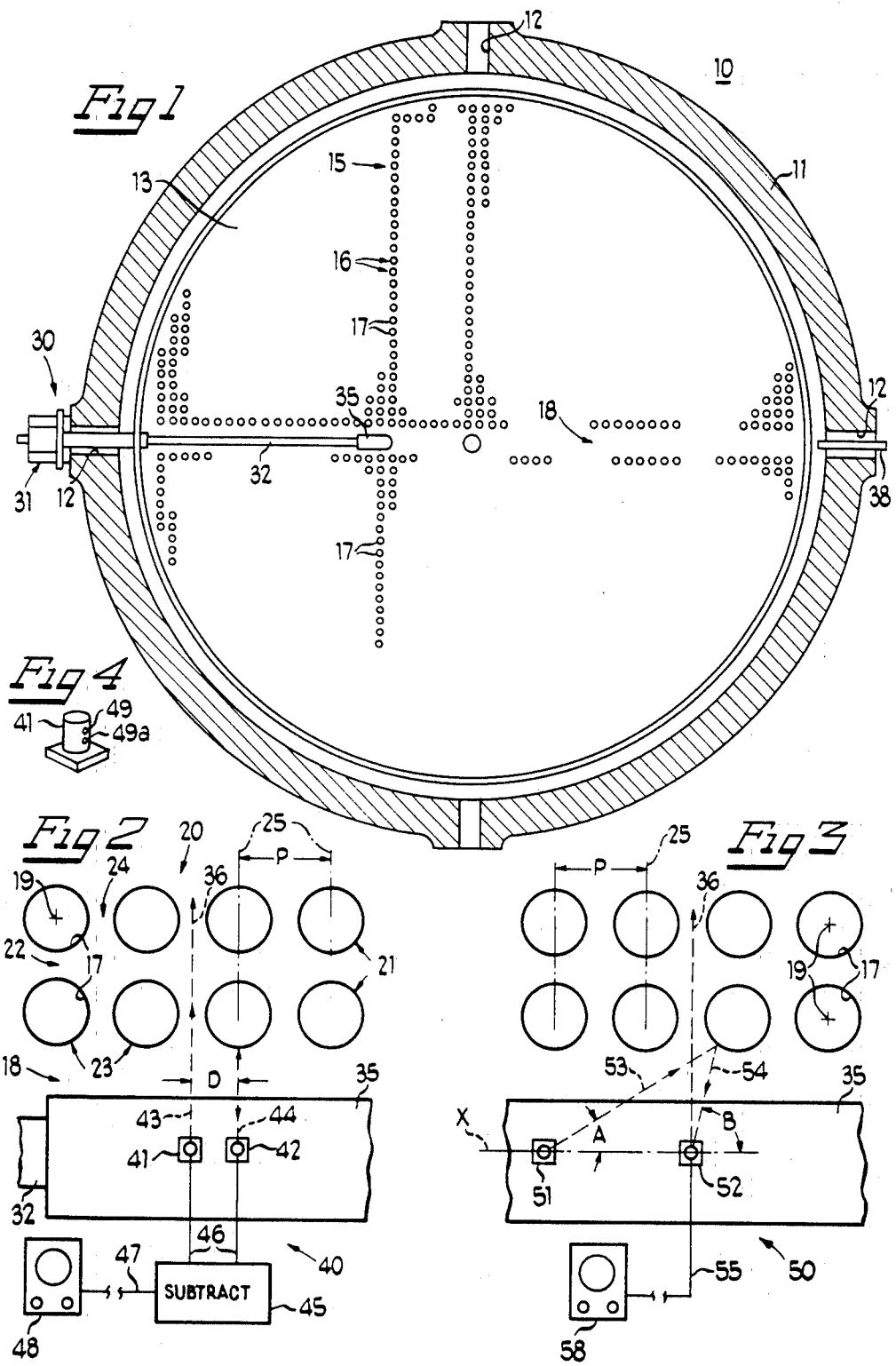

WORKPIECE POSITIONING APPARATUS WITH PLURAL SENSORS

BACKGROUND OF THE INVENTION

The present invention relates to a system for accurately positioning a workpiece with respect to an array of spaced-apart members. The inventon has particular application to the maintenance of a nuclear steam generator, and specifically to the accurate positioning of a workpiece, such as a fluid lance nozzle, with respect to the heat-exchange tubes of the steam generator.

A typical nuclear steam generator comprises a vertically oriented shell and a plurality of inverted U-shaped tubes disposed in the shell so as to form a tube bundle. Each tube has a pair of elongated vertical portions interconnected at the upper end by a curved bight portion, so that the vertical portions of each tube straddle a center lane or passage through the tube bundle. The tubes are dimensioned and arranged so that, on each side of the center tube lane or passage, the vertical tube portions are disposed in an array of parallel rows and parallel columns, with the rows and columns extending perpendicular to each other. The tubes may be arranged in a so-called "square pitch" array or in a so-called "triangular pitch " array. In a square pitch array the spacing between adjacent columns is the same as the spacing between adjacent rows, and each column contains a tube in every row which it intersects, and vice versa. In a triangular pitch array, the spacing between adjacent columns is different from the spacing between adjacent rows, and the array is staggered so that each column contains a tube in every other row which it intersects, and vice versa. In the triangular pitch array, the free space between adjacent columns is substantially less than in the square pitch array.

A tube sheet supports the vertical portions of the tubes at their lower ends. The vertical tube portions on one side of the center tube lane are connected to a primary fluid inlet plenum and those on the other side of the center tube lane are connected to a primary fluid outlet plenum. The primary fluid, having been heated by circulation through the reactor core, enters the steam generator through the primary fluid inlet plenum, is transmitted through the tube bundle and out the primary fluid outlet plenum. At the same time, a secondary fluid or feedwater is circulated around the tubes above the tube sheet in heat transfer relationship with the outside of the tubes, so that a portion of the feedwater is converted to steam which is then circulated through standard electrical generating equipment.

Sludge, mainly in the form of iron oxides and copper compounds along with traces of other metals, settles out of the feedwater onto the tube sheet. The sludge deposits provide a site for concentration of phosphate solution or other corrosive agents at the tube walls that results in tube thinning. Accordingly, the sludge must be periodically removed.

One known method for removal of the sludge is referred to as the sludge lance-suction method. Sludge lancing consists of using high pressure water to break up and slurry the sludge in conjunction with suction and filtration equipment that remove the water-sludge mixture for disposal or recirculation. A high velocity water lance is introduced through a handhole and moved along the center tube lane adjacent to the tube sheet. The lance emits a high-velocity water jet perpendicular to the movement of the lance, i.e., parallel to the columns of tubes. The lance is stopped in predetermined positions so that the water jet is directed along the channel or space between adjacent tube columns.

It is essential that the lance nozzle be accurately positioned so that the water jet is confined to the channels between adjacent tube columns and does not directly strike the tubes, particularly the tubes in the row closest to the center tube lane. Correct alignment is particularly important in narrow gap steam generators where triangular pitch tube arrays are used, and where a displacement of as little as 0.01 inch could render the sludge lance ineffective in removing sludge.

One method and apparatus for aligning workpieces such as sludge lance nozzles is disclosed in the copending application of Clark B. Candee, Ser. No. 576,678, filed Feb. 3, 1984, , assigned to the Assignee of the present invention, now abandoned. That method utilizes an eddy current probe mounted on the sludge lance nozzle for producing a maximum output signal when the probe is directly opposite one of the tubes. Other current methods utilize mechanical sensing arms. Neither method can be used while the sludge lance is operating due to mechanical restrictions. Also, the eddy current device tends to be affected by the presence of water mist, vibration, etc. which are present when the lance is operating. In addition, the eddy current device requires delicate adjustment for an operator to catch the peak signal, since the tube returns a reflected signal which is relatively flat near its peak.

SUMMARY OF THE INVENTION

It is a general object of the present invention to provide an improved workpiece positioning apparatus which avoids the disadvantages of prior apparatuses, while affording additional structural and operating advantages.

An important object of the invention is the provision of a workpiece positioning apparatus which affords highly accurate positioning of a workpiece from a remote location and which permits relatively easy discrimination of a predetermined position from adjacent positions.

In connection with the foregoing object, it is another object of the invention to provide a workpiece positioning apparatus of the type set forth which utilizes more than one sensing device.

Another object of the invention is the provision of a workpiece positioning apparatus of the type set forth, which can be used for positioning a sludge lance nozzle without having to turn off the nozzle.

These and other objects of the invention are attained by providing apparatus for accurately positioning a workpiece with respect to the vertical tubes of a nuclear steam generator wherein the tubes are disposed in an array of parallel rows and parallel columns, with the tubes in each column having their axes aligned in a common column plane and with a predetermined spacing between the tubes of adjacent columns, the apparatus comprising: transport means for moving the workpiece past the columns of tubes closely adjacent thereto in the directions perpendicular to the column planes thereof, a plurality of sensing means associated with the workpiece of movement therewith, each of the sensing means being responsive to adjacent tubes for generating a detection signal which varies as a function of the distance between the sensing means and the closest one of the tubes, the sensing means being positioned so that the detection signals therefrom are related by a predetermined function, and processing means coupled to each of the sensing means and responsive to the detection signal therefrom for producing in accordance with the predetermined function a position-indicating signal which is a maximum when the workpiece is in a predetermined position with respect to one of the column planes.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a view in horizontal section through a nuclear steam generator vessel having tubes arranged in square pitch array, taken just above the tube sheet, and illustrating a fluid lance mounted in lancing position and incorporating positioning apparatus constructed in accordance with and embodying the features of the present invention;

FIG. 2 is an enlarged fragmentary view of a portion of FIG. 1, including the lance nozzle and the positioning apparatus, in accordance with a first embodiment of the present invention;

FIG. 3 is a view similar to FIG. 2, illustrating a second embodiment of the present invention; and FIG. 4 is a perspective diagrammatic view of one of the sensors of FIG. 2.

DESCRIPTION OF THE PREFERRED EMBODIMENTS

Referring to FIG. 1, there is illustrated a nuclear steam generator vessel, generally designated by the numeral 10, which includes an elongated, generally cylindrical wall 11 provided with handholes or inspection ports 12 therethrough at equiangularly spaced-apart points around the circumference thereof. Extending across and closing the vessel 10 adjacent to the lower end thereof is a circular tube sheet 13 on which is mounted a tube bundle, generally designated by a numeral 15. The tube bundle 15 includes a plurality of heat transfer tubes 16 which may number about 7,000, and each of which is generally in the shape of an inverted U. Each tube 16 has a pair of vertical portions 17 which straddle a center tube lane 18 extending diametrically across the tube sheet 13. The lower ends of each of the vertical portions 17 are inserted in complementary openings through the tube sheet 13 and communicate with inlet and outlet plenums (not shown) in the vessel 10 beneath the tube sheet 13, all in a well known manner.

Referring also to FIG. 2, each of the vertical tube portions 17 is substantially circular in transverse cross section and has a longitudinal axis 19. The vertical tube portions 17 are arranged in what is commonly referred to as a "square pitch" array, generally designated by the numeral 20, comprising a plurality of parallel rows 21 equidistantly spaced apart by inter-row lanes 22, and a plurality of parallel columns 23, equidistantly spaced apart by inter-column channels 24, with the columns 23 extending perpendicular to the rows 21. The axes 19 of the vertical tube portions 17 in each column 23 lie in a common vertical column plant 25. In the square pitch array 20, each inter-column channel 24 has a width substantially equal to that of each inter-row lane 22. This width is typically in the range of from about 0.71 cm to about 1.02 cm.

It will be understood that the vertical portions 17 could also be arranged in a "triangular pitch" array, in which the rows and columns of tubes are disposed in a staggered arrangement. This "triangular pitch" array is disclosed more specifically in the aforementioned co-pending application Ser. No. 576,678.

There is mounted on the nuclear steam generator vessel 10 a fluid lance, generally designated by the numeral 30, for the purpose of removing sludge which builds up on the tube sheet 13 between the columns and rows of tubes 16. The fluid lance 30 is mounted on the wall 11 adjacent to one of the handholes 12 by a suitable mounting and drive apparatus 31, which may be substantially like that disclosed in U.S. Pat. No. 4,273,076. The disclosure of that patent is incorporated herein by reference, so that only as much of the structure of the fluid lance 30 as is necessary for an understanding of the present invention need be described in detail herein.

The fluid lance 30 includes an elongated tubular arm 32, which is extended through the handhole 12 coaxially therewith, substantially radially of the tube sheet 13 along the center tube lane 18. The arm 32 carries the lancing fluid in a known manner to a nozzle 35 mounted on the distal end of the arm 32. The nozzle 35 has at least one outlet opening for emitting a cleaning jet or stream of fluid generally along an axis 36 parallel to the column planes 25. In operation, it will be appreciated that the nozzle 35 is moved along the center tube lane 18 parallel to the rows 21 of the vertical tube portions 17.

Referrring now in particular to FIG. 2 of the drawings, there is illustrated a positioning apparatus generally designated by the numeral 40, which includes two sensors 41 and 42 mounted on the nozzle 35 and spaced apart longitudinally thereof in the direction of movement thereof. Preferably, the sensors 41 and 42 are of the same type, and each may be, e.g., an eddy current sensor, a photoelectric sensor, a proximity device, a laser driven fiberoptic device, a capacitance sensor, a magnetic sensor or an ultrasonic sensor. However, preferably each of the sensors 41 and 42 comprises a transmitter/receiver which emits a signal, such as an electrical sound or light signal, and receives reflections of that signal from the vertical tube portions 17. The sensors 41 and 42 respectively emit signals along axes which lie in planes 43 and 44, parallel to the column planes 25. For purposes of the present discussion, it will be assumed that each of the sensors 41 and 42 is an optical sensor, emitting a light signal, such as from a light-emitting diode (LED) 49, and receiving reflected light signals in a photodiode or other suitable photoelectric sensing element 49a (FIG. 4).

In a square pitch array, such as that illustrated in FIG. 2, the tube axes 19 of adjacent columns of tubes are separated by a distance P which defines the tube pitch of the array. The sensors 41 and 42 are positioned on the nozzle 35 so that their transmitting planes 43 and 44 are spaced apart a distance D such that $D=(2N-1)P/2$, where N is a positive integer. In other words, the transmitting planes 43 and 44 are spaced apart an odd multiple of half tube pitches, so that when the transmitting plane 44 is coplanar with a tube column plane 25, the transmitting plane 43 will be disposed midway between two adjacent columns 23, i.e., centered in the inter-column channel 24. Preferably, the nozzle axis 36 is coplanar with the transmitting plane 43 or is spaced an integral number of tube pitches therefrom, so that when the nozzle 35 is disposed in a lancing position, illustrated in FIG. 2, the nozzle axis 36 will be centered in one of the inter-column channels 24.

In operation, since each of the sensors 41 and 42 receives only reflected signals which are coplanar with the transmitted signals, it can receive the signal reflected from its own transmitting portion only when the transmitting plane 43 or 44 is coplanar with one of the tube column planes 25. This is due to the fact that, since the vertical tube portions 17 have cylindrical outer surfaces, the transmitted and reflected signals can lie in the same transmitting plane only when the transmitted signal lies in a radial plane of the tube from which it is reflected. FIG. 2 illustrates the nozzle 35 in a lancing position wherein the transmitting plane 44 of the sensor 42 is coplanar with one of the tube column planes 25. In this arrangement, the reflected signal received by the sensor 42 will be a maximum, so that it will produce a maximum output signal. Simultaneously, the transmitting plane 43 of the sensor 41 is disposed centrally of the adjacent inter-column channel 24, so that its transmitted signal is not reflected by any tube. Thus, the reflected signal received by the sensor 41 will be at a minimum, so that it produces a minimum output signal.

The output signals from the sensors 41 and 42 are applied over conductors 46 to a processing circuit 45. Preferably, the processing circuit 45 includes means for subtracting the output signal from the sensor 41 from the output signal from the sensor 42 to produce a difference signal which is applied via the conductor 47 to an output indicating device 48, such as an oscilloscope or the like. It will be appreciated that in the lancing position illustrating in FIG. 2, where the output signal from the sensor 42 is a maximum and that from the sensor 41 is at a minimum, the difference signal therebetween will be at a maximum. Because of this subtraction process, the difference signal will vary much more rapidly adjacent to its peaks than would be the case with a signal sensor. Furthermore, the subtraction process subtracts out interferences due to water mist, vibration or the like, so that the positioning apparatus 40 can be utilized while the lance 30 is in operation. This is a significant advantage, since it obviates shutting down of the water flow during the positioning process.

Referring now in particular to FIG. 3 of the drawings, there is illustrated another embodiment, generally designated by the numberal 50, of the positioning apparatus of the present invention. The positioning apparatus 50 includes a transmitter 51 and a receiver 52, both mounted on the nozzle 35 and spaced apart along the longitudinal axis X thereof in the direction of movement thereof, with the receiver 52 disposed ahead of the transmitter 51. The transmitter 51 and the receiver 52 may each be designed for handling various types of signals such as electrical signals, light signals, sound signals etc., but for purposes of the present discussion it will be assumed that the transmitter 51 is an optical transmitter, such as an LED, and that the receiver 52 is an optical receiver such as a photodiode or other suitable photoelectric sensing element.

The transmitter 51 is arranged so that it transmits a signal in a transmitting direction centered about a transmitting plane 53, disposed perpendicular to the tube sheet 13 and inclined at a predetermined non-zero acute angle A with respect to the longitudinal axis X of the nozzle 35. The receiver 52 is preferably positioned so that its center is coplanar with the nozzle axis 36, although this is not essential. Preferably, the receiver 52 has a very narrow receiving aperture so that it will receive and respond to only light signals arriving in a predetermined receiving plane 54 disposed perpendicular to the tube sheet 13 and inclined at a non-zero acute angle B with respect to the longitudinal axis X of the nozzle 35.

The angle B is so related to the spacing of the transmitter and receiver 51 and 52, and to the radius of the outer surfaces of the vertical tube portions 17, that the signal transmitted from the transmitter 51 and reflected from the vertical tube portions 17 in the first row of tubes adjacent to the center tube lane 18, will be received by the receiver 52 only when the nozzle 35 is disposed in a lancing position, illustrated in FIG. 3, wherein the nozzle axis 36 is disposed centrally of one of the inter-column channels 24, midway between two adjacent tube columns 23. In this position, the receiver 52 will produce a maximum output signal, which is applied via a cable 55 to an output indicating device 58, such as an oscilloscope or the like. It will be appreciated that in this embodiment the output signal from the receiver 52 will be in the form of a very sharp spike, which moves from a substantially zero amplitude when the refelcted signal is outside the receiving plane 54 to a high amplitude when the reflected signal is in the receiving plane 54. This makes it very easy for an operator to recognize the lancing position of the nozzle 35.

While in the embodiments of the invention described above, the invention has been utilized for the postioning of a sludge lance nozzle, it will be appreciated that the positioning apparatus 40 or 50 could be utilized to position any other type of workpiece movable along the tube lane 18. Any such alternative type of workpiece could be adapted to have the positioning apparatus 40 or 50 mounted directly thereon in the same manner as it is mounted on the nozzle 35.

It will also be appreciated that the positioning apparatus 40 or 50 is uniquely adapted for automatic and remote-control operation. More particularly, when coupled with a computer program including a stored map of the tube array, the positioning apparatus 40 or 50 can be utilized as an indicator of absolute position within the nuclear steam generator vessel 10. In the preferred embodiments described above, the output indicating devices 48 and 58 are preferably located outside the steam generator vessel 10. The processing circuit 45 is preferably carried by the nozzle 35, but it may also be located outside the vessel 10.

From the foregoing, it can be seen that there has been provided an improved positioning apparatus for accurately positioning a fluid lance nozzle or other workpiece with respect to the vertical portions of the tubes of a nuclear steam generator, the positioning apparatus being usable while the lance nozzle is operating, and being characterized by ease of recognition of the desired lancing positions.

What is claimed is:

1. Apparatus for accurately positioning a workpiece with respect to the vertical tubes of a nuclear steam generator wherein the tubes are disposed in an array of parallel rows and parallel columns, with the tubes in each column having their axes aligned in a common column plane with a predetermined spacing between the tubes of adjacent columns, said apparatus comprising transport means for moving the workpiece past the columns of tubes closely adjacent thereto in directions perpendicular to the column planes thereof, a plurality of sensing means associated with the workpiece for movement therewith, each of said sensing means being responsive to adjacent tubes for producing a detection signal which varies as a function of the distance between said sensing means and the closest one of the tubes, said sensing means being positioned so that the detection signals therefrom are related by a predetermined function, and reprocessing means coupled to each of said sensing means and responsive to the detection signals therefrom for producing in accordance with said predetermined function a position-indicating signal which is a maximum when the workpiece is in a predetermined position with respect to one of the column planes.

2. The positioning apparatus of claim 1, wherein the number of sensing means is two.

3. The positioning apparatus of claim 2, wherein said sensing means are positioned so that the detection signals therefrom vary inversely with respect to each other.

4. The positioning apparatus of claim 3, wherein said processing means includes means for subtracting one of said detection signals from the other.

5. The positioning apparatus of claim 1, wherein each of said sensing means includes means for transmitting an output signal which is reflected by tubes which intercept it, and means for receiving reflected signals from the tubes.

6. The positioning apparatus of claim 5, wherein each of said sensing means includes optical means for transmitting and receiving light rays.

7. The positioning apparatus of claim 1, wherein each of said sensing means includes a transmitter/receiver.

8. The positioning apparatus of claim 1, wherein each of said sensing means is mounted on the workpiece.

9. Apparatus for accurately positioning a workpiece with respect to the vertical tubes of a nuclear steam generator wherein the tubes are disposed in an array of parallel rows and parallel columns, with the tubes in each column having their axes aligned in a common column plane and with a predetermined spacing between the tubes of adjacent columns, said apparatus comprising: transport means for moving the workpiece past the columns of tubes closely adjacent thereto in directions perpendicular to the column planes thereof, first and second sensing means associated with the workpiece for movement therewith, each of said sensing means having a sensing axis disposed parallel to the column planes, said first and second sensing means being disposed so that said sensing axes are spaced apart a distance D such that $D = (2N-1) P/2$ wherein N is a positive integer and P is the distance between adjacent column planes, said sensing means being responsive to adjacent tubes for respectively generating first and second detection signals each of which varies between a maximum value when the associated sensing axis is coplanar with a column plane and a minimum value when said sensing axis is disposed midway between two adjacent column planes, and subtraction means coupled to each of said first and second sensing means for subtracting said second detection signal from said first detection signal to produce a difference signal which is a maximum when said first sensing axis is coplanar with a column plane.

10. The positioning apparatus of claim 9 wherein each of said sensing means includes means for transmitting an output signal which is reflected by tubes which intercept it.

11. The positioning apparatus of claim 10, wherein each of said sensing means includes optical means for transmitting and receiving light rays.

12. The positioning apparatus of claim 9, wherein $N=1$.

13. The positioning apparatus of claim 9, wherein each of said sensing means is mounted on the workpiece.

14. The positioning apparatus of claim 9, wherein the workpiece comprises a lancing nozzle having a nozzle axis disposed parallel to the column planes.

15. The positioning apparatus of claim 14, wherein the sensing axis of said first sensing means is coplanar with said nozzle axis.

16. Apparatus for accurately positioning a workpiece with respect to the vertical tubes of a nuclear steam generator wherein the tubes are disposed in an array of parallel rows and parallel columns, with the tubes in each column having their axes aligned in a common column plane and with a predetermined spacing between the tubes of adjacent columns, said apparatus comprising: transport means for moving the workpiece past the columns of tubes closely adjacent thereto in directions perpendicular to the column planes thereof, transmitting means associated with the workpiece for movement therewith, and receiving means associated with the workpiece for movement therewith and spaced a predetermined distance from said transmitting means in the direction of movement of the workpiece, said transmitting means transmitting an output signal generally in a first direction inclined at a first predetermined angle with respect to the direction of movement of the workpiece, said output signal being reflected from tubes in the nearest row of tubes in a direction which varies with the position of the workpiece relative to the reflecting tube, said receiving means being disposed for intercepting and being responsive to only reflected signals received substantially in a second predetermined direction inclined at a second predetermined angle with respect to the direction of movement of the workpiece for producing a position-indicating signal, said transmitter and said receiver being positioned with respect to the workpiece so that said position-indicating signal is produced only when the workpiece is disposed in a predetermined lancing position with respect to one of the column planes.

17. The positioning apparatus of claim 16, wherein said receiving means is disposed ahead of said transmitting means in the direction of movement of the workpiece.

18. The positioning apparatus of claim 16, wherein the workpiece comprises a lancing nozzle having a nozzle axis disposed parallel to the column planes.

19. The positioning apparatus of claim 18, wherein said receiving means is disposed in a plane parallel to the column planes and including said nozzle axis.

20. The positioning apparatus of claim 16, wherein said transmitting means includes a light source and said receiving means includes a light-sensitive means.

* * * * *